United States Patent [19]

Kawata et al.

[11] Patent Number: 4,540,060
[45] Date of Patent: Sep. 10, 1985

[54] AUTOMOBILE SPEED CONTROL SYSTEM

[75] Inventors: Shoji Kawata; Hitoshi Hyodo, both of Okazaki; Tokihiko Akita, Toyota, all of Japan

[73] Assignee: Aisin Seiki Kabushiki Kaisha, Kariya, Japan

[21] Appl. No.: 585,044

[22] Filed: Mar. 1, 1984

[30] Foreign Application Priority Data

Mar. 1, 1983 [JP] Japan ............... 58-034268
Mar. 15, 1983 [JP] Japan ............... 58-042828

[51] Int. Cl.$^3$ .............................. B60K 31/00
[52] U.S. Cl. ............... 180/179; 364/426; 364/431.07
[58] Field of Search ........... 123/352; 180/170, 176, 180/177, 178, 179; 364/424, 426, 431.03, 431.07, 431.12

[56] References Cited

U.S. PATENT DOCUMENTS

| | | | |
|---|---|---|---|
| 3,381,771 | 5/1968 | Granger et al. | 180/179 |
| 4,138,723 | 2/1979 | Nehmer et al. | 364/426 X |
| 4,196,787 | 4/1980 | Sakakibara | 180/179 |
| 4,359,125 | 11/1982 | Shinoda et al. | 180/179 |
| 4,380,799 | 4/1983 | Allard et al. | 180/178 X |
| 4,463,822 | 8/1984 | Tanigawa et al. | 180/179 X |
| 4,470,478 | 9/1984 | Hayashi et al. | 123/352 X |
| 4,484,279 | 11/1984 | Muto | 180/170 X |

Primary Examiner—Parshotam S. Lall
Assistant Examiner—W. R. Wolfe
Attorney, Agent, or Firm—Sughrue, Mion, Zinn, Macpeak & Seas

[57] ABSTRACT

An automobile speed control system for use with an automobile includes a throttle valve, actuator means operatively connected to the throttle valve for actuating the throttle valve, a plurality of switch means, detector means for detecting a speed of the automobile, a plurality of automobile speed memories, and electronic control means for storing values dependent on output signals issued from the detector means into the automobile speed memories, respectively, in response to operation of the switch means, for reading the values, one at a time, from the automobile speed memories in response to operation of the switch means, and for energizing the actuator means according to the read values.

21 Claims, 12 Drawing Figures

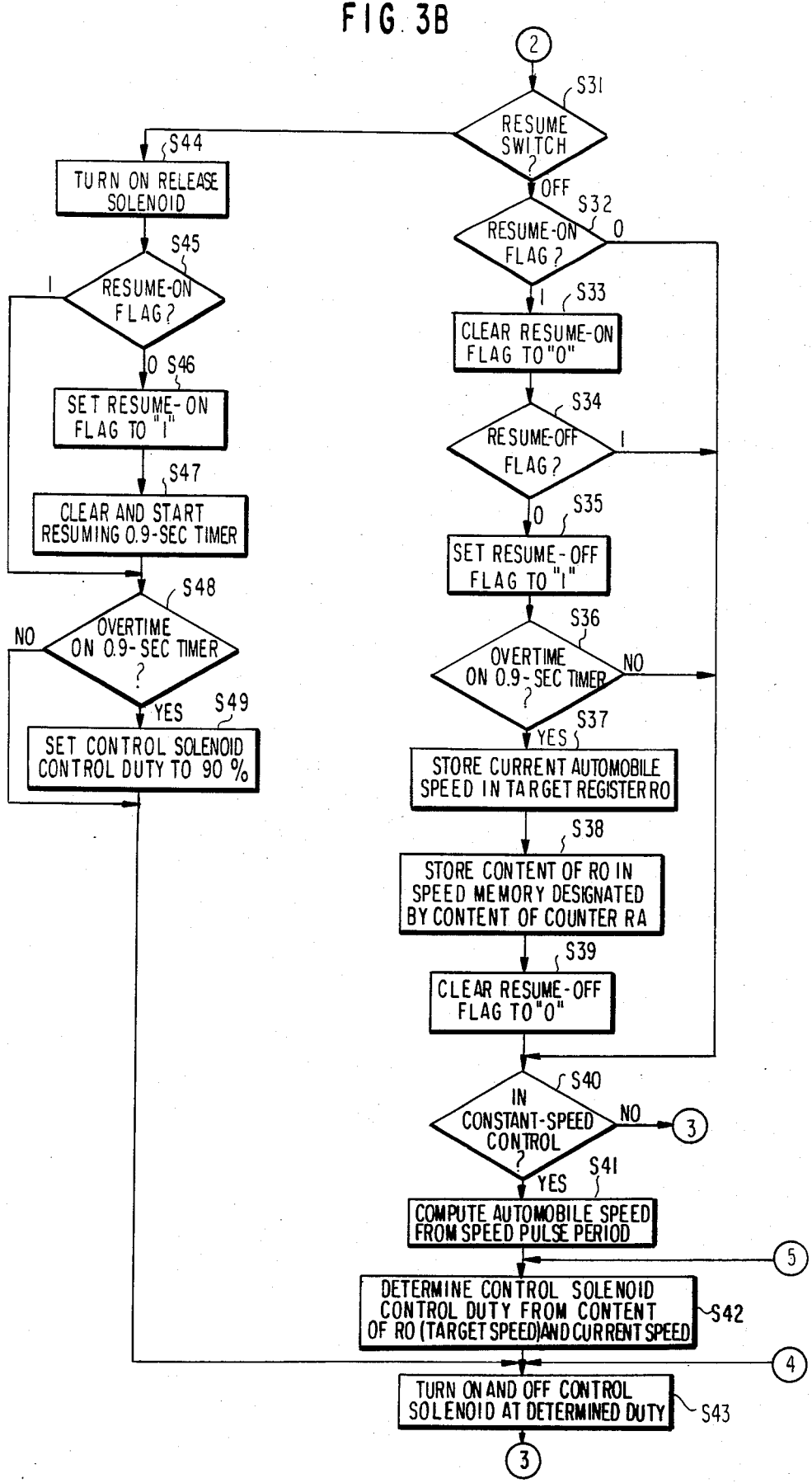

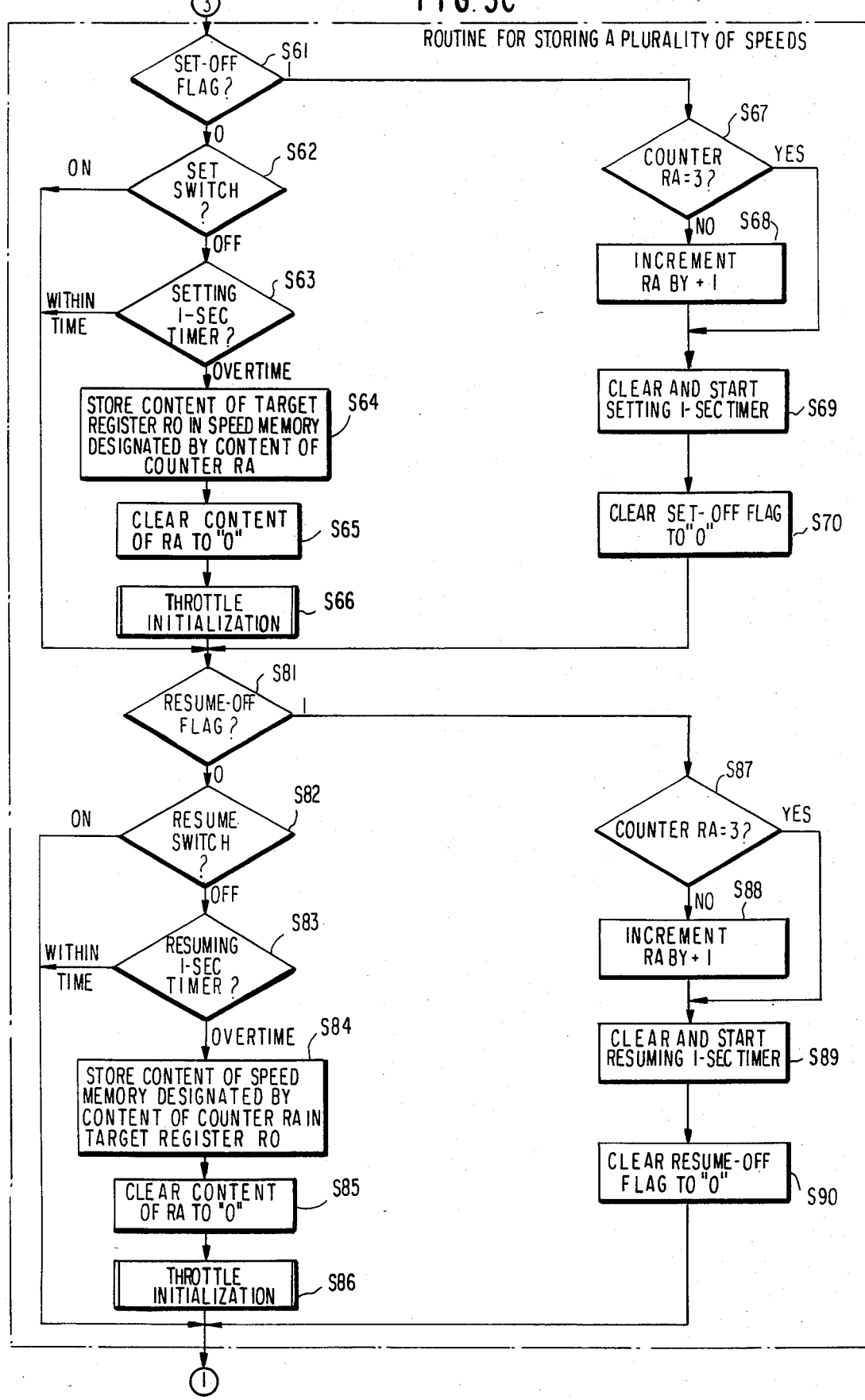

AUTOMOBILE SPEED CONTROL SYSTEM

BACKGROUND OF THE INVENTION

The present invention relates to an automobile speed control system for automatically controlling an automobile to run at a stored speed, and more particularly to an automobile speed control system capable of storing a plurality of different speeds and controlling an automobile to cruise at a selected one of the stored speeds.

Prior automobile speed controls detect a current automobile speed as a number of pulses and produces an analog voltage commensurate with the number of pulses as a signal indicative of the current automobile speed. When the automobile reaches a desired speed, the driver depresses a speed set switch to set or store the speed signal at that time into a speed memory. The speed control includes a comparator for comparing a signal representative of a current automobile speed with the stored speed signal which serves as a reference voltage. The speed of the automobile can be maintained at the desired value by adjusting the opening of a throttle valve in the engine on the automobile in order that any difference between the compared signals will fall to zero.

One known example of such an automobile speed control is disclosed in U.S. Pat. No. 4,196,787 issued on Apr. 8, 1980 to the same assignee.

The prior automobile speed control system is capable of storing only one selected speed value. When the driver wants to lower the automobile speed down to 40 Km/h while the automobile is running at the speed of 60 Km/h under automatic speed control, the driver is required to release the speed control to let the automobile slow down, and then depress the speed set switch when the speedometer reading reaches 40 Km/h to resume the speed control. However, such manual speed changing operation is considerably awkward while driving the automobile. Automobiles are legally required to observe speed limits such as 40 Km/h, 60 Km/h, and 80 Km/h imposed on various kinds of roads and highways. It is therefore normal practice for automobiles to run on roads and highways at their speed limits. When an automobile enters a different road having a different speed limit, the automobile has to change its speed. Upon setting and storing a new speed after the automobile has changed it speed, previous stored speed data is erased. If the automobile is to be restored to the previous speed, then the driver has to perform the awkward speed changing operation once again.

SUMMARY OF THE INVENTION

It is an object of the present invention to provide an automobile speed control system which can change speed settings with ease when road conditions vary at frequent intervals.

Another object of the present invention is to provide an automobile speed control system having a reduced number of switches which the driver has to manipulate while driving the automobile.

According to the present invention, there are provided a plurality of automobile speed memories, and one of the speed memories is selected at a time by an operative condition of a switch, such as the number of depressions thereof. When a set switch is depressed, an automobile speed is stored in the selected speed memory. When a resume switch is depressed, data is read from the speed memory to control the automobile speed. With this arrangement, only one set switch and one resume switch will suffice, and they do not take up a large space on an instrument panel and can be manipulated easily. A plurality of automobile speeds, such as 40 Km/h, 60 Km/h and 80 Km/h, can be stored in advance by the set switch, and can easily be changed over simply by operating on the resume switch to meet road conditions. When setting an automobile speed, it is troublesome to manipulate the switches by hand while operating on accelerator and brake pedals with a foot. According to a preferred aspect of the invention, while the set and resume switches are in a prescribed state, the automobile speed is increased or reduced so that the driver can easily change and store an automobile speed only by hand without using the foot on the accelerator and brake pedals.

According to another embodiment of the invention, there are provided a set switch, a resume switch and a plurality of automobile speed memory selector switches. When the set switch is operated upon, an automobile speed at that time is stored in one of the speed memories which is designated by a condition of the automobile speed memory selector switches. When the resume switch is operated upon, an automobile speed according to the stored content of a speed memory designated by a condition of the automobile speed memory selector switches is established as a target speed with which the speed of the automobile will be controlled. With this embodiment, a plurality of automobile speeds can be stored and retrieved with a small number of switches without imparing driver's driving activities.

According to still another embodiment, pairs of set and resume switches are associated respectively with the automobile speed memories. When the nth set switch is operated upon, an automobile speed at that time is stored in the nth automobile speed memory. When the mth resume switch is operated upon, data stored in the mth automobile speed memory is established as a target speed, and the automobile is controlled to achieve the target speed.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 3A, 3B and 3C are a flowchart showing operation of a CPU in the electric circuit of FIG. 1;

DESCRIPTION OF THE PREFERRED EMBODIMENTS

Figure 1:
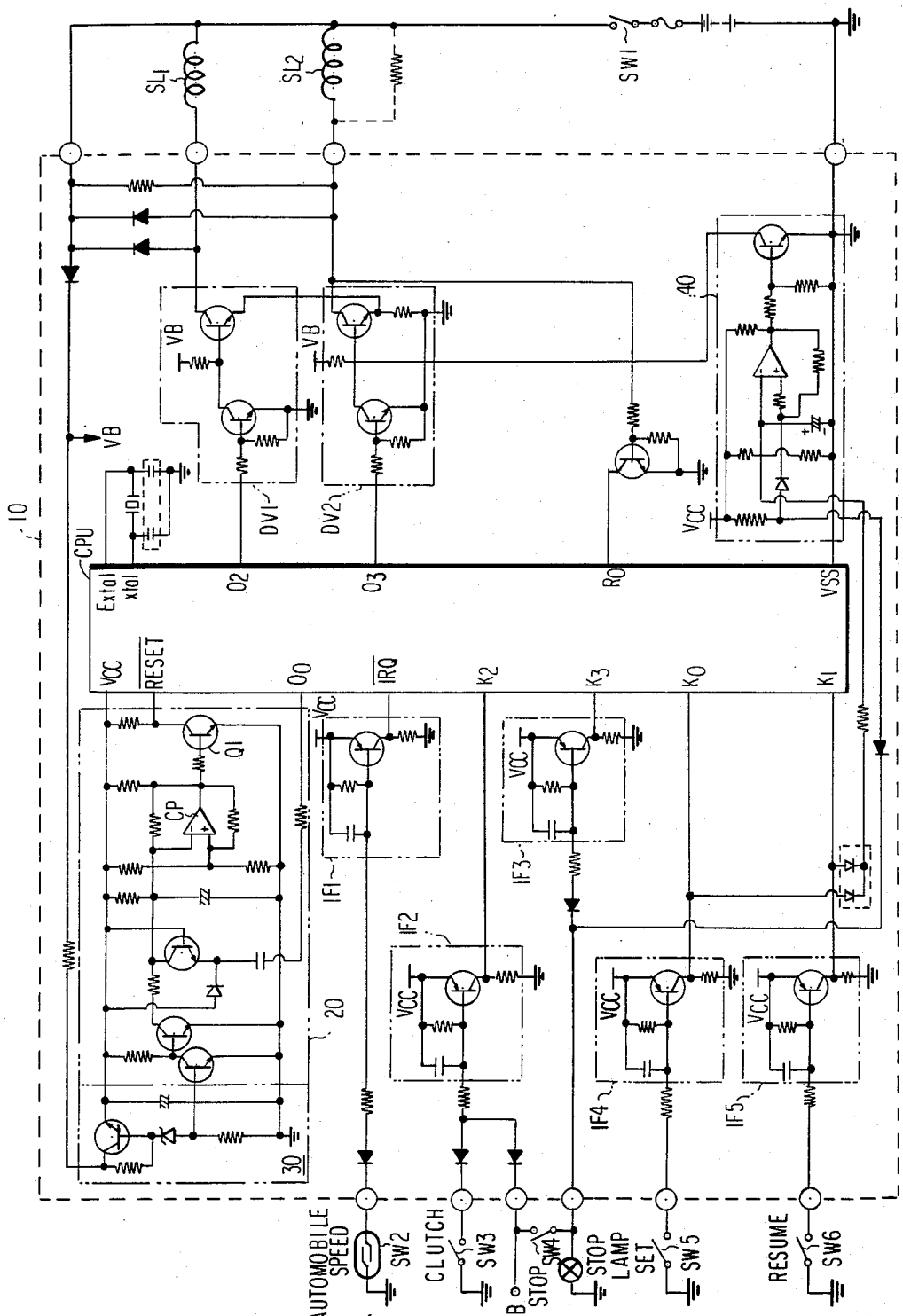
FIG. 1 is a block diagram of an electric circuit of an automobile speed control system according to an embodiment of the present invention.

FIG. 1 shows an electric circuit of an automobile speed control system for use on an automobile, according to an embodiment of the present invention. The automobile speed control system has an electronic control unit 10 including a single-chip microcomputer CPU. The microcomputer CPU has a reset port RESET connected to a runaway detecting circuit 20 and an interrupt port IRQ and input ports K2, K3, K0 and K1 which are coupled through interfaces IF1, IF2, IF3, IF4 and IF5 to a speed detecting reed switch SW2, a clutch switch SW3, a stop switch SW4, a set switch SW5, and a resume switch SW6, respectively.

Adjacent to the speed detecting reed switch SW2, there is disposed a permanent magnet (not shown) attached to a speedometer cable. The contacts of the speed detecting reed switch SW2 are connected and disconnected as the permanent magnet is rotated when the automobile runs. When the switch SW2 is opened, the output from the interface IF1 changes from a high level to a low level to impose an interrupt request on the microcomputer CPU.

The clutch switch SW3 is opened and closed in response to movement of a clutch pedal in the automobile. The stop switch SW4 is opened and closed in response to movement of a brake pedal in the automobile. The stop switch SW4 is connected to a stop lamp which is turned on when the switch SW4 is turned on or closed.

The set switch SW5 and the resume switch SW6 comprise pushbutton switches located on an instrument panel in the automobile at positions which can easily be accessed by the driver.

The microcomputer CPU has an output port O0 connected to the runaway detecting circuit 20 and output ports O2, O3 connected to drivers DV1, DV2, respectively. The driver DV1 has an output terminal coupled to a control solenoid SL1 for controlling a vacuum actuator (described later on), and the driver DV2 has an output terminal coupled to a release solenoid SL2 for releasing the vacuum actuator. The control solenoid SL1, the release solenoid SL2, and a constant-voltage regulated power supply 30 which generates a constant voltage Vcc are supplied with a voltage from an automobile battery through an ignition key SW1. The release solenoid SL2 can be de-energized, independently of operation of the microcomputer CPU, by a circuit 40 when the brake is operated upon.

Figure 2:
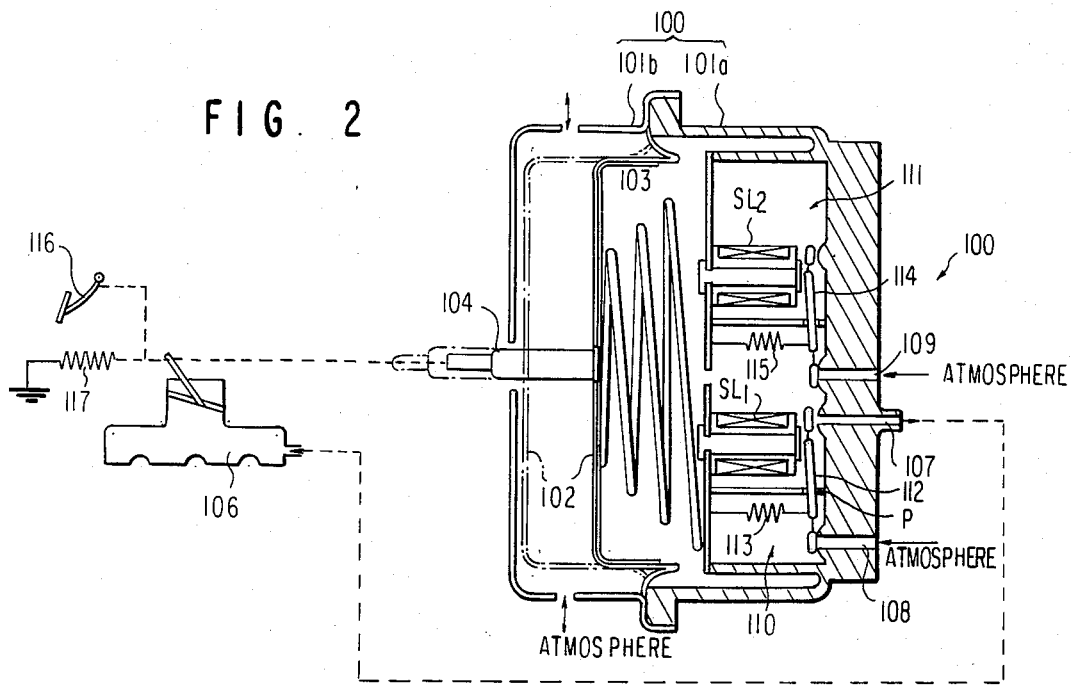
FIG. 2 is a vertical cross-sectional view of a vacuum actuator controlled by the electric circuit shown in FIG. 1.

FIG. 2 is illustrative of a vacuum actuator 100 controlled by the electric circuit shown in FIG. 1. The vacuum actuator 100 comprises a housing 101 composed of two members 101a, 101b coupled together and a diaphragm 102 clamped between flanges of the housing members 101a, 101b. A space defined between the diaphragm 102 and the housing member 101a serves as a vacuum chamber, and a space defined between the diaphragm 102 and the housing member 101b is vented to the atmosphere. A compression coil spring 103 is disposed between the housing member 101a and the diaphragm 102 for pushing the diaphragm 102 back to the imaginary-line position when the pressure in the vacuum chamber approaches the atmospheric pressure.

A projection 104 is fixed centrally to the diaphragm 102 and connected to a link of a throttle valve 105. The housing member 101a has a vacuum inlet port 107 communicating with an intake manifold 106 and atmosphere inlet ports 108, 109.

The vacuum actuator 100 has therein a vacuum control valve 110 and a vacuum release valve 111 fixed to the housing member 101a. The vacuum control valve 110 has a movable member 112 tiltable about a fulcrum P and having one end connected to a tension coil spring 113 and the other end disposed in confronting relation to the control solenoid SL1 disposed in the housing member 101a. The ends of the movable member 102 serve as valve bodies for opening the vacuum inlet port 107 and closing the atmosphere inlet port 108 (as illustrated) when the control solenoid SL1 is energized and closing the vacuum inlet port 107 and opening the atmosphere inlet port 108 when the control solenoid SL1 is de-energized. The vacuum release valve 111 also has a movable member 114 tiltable about a fulcrum and having one end connected to a tension coil spring 115 and the other end located closely to the release solenoid SL2 disposed in the housing member 101a. The movable member 114 serves as a valve body for closing the atmosphere inlet port 109 (as illustrated) when the release solenoid SL2 is energized and opening the atmosphere inlet port 109 when the release solenoid SL2 is de-energized.

Operation of the microcomputer CPU shown in FIG. 1 will be described with reference to FIGS. 3A through 3E. When the automobile is running, the reed switch SW2 is cyclically turned on and off at all times, and the microcomputer CPU executes an interrupt process shown in FIG. 3D each time the reed switch SW2 is turned off.

When the power supply is switched on, the microcomputer CPU is initialized at a step S1, that is, the output ports are set to an initial level, and the stored contents of memories are cleared.

Then, the level at the output port O0 is inverted at a step S2. More specifically, when the port O0 is at a high level H, it is set to a low level L, and when the port O0 is at the low level L, it is set to the high level H. This level inversion is alway executed once in a prescribed period of time when the microcomputer CPU operates normally, thus applying a pulse signal of a substantially fixed period from the microcomputer CPU to the runaway detecting circuit 20. In response to a pulse signal, the runaway detecting circuit 20 renders the output level of a comparator CP high to energize a transistor Q1, thereby bringing the RESET terminal of the microcomputer CPU to a high level H. When the microcomputer CPU suffers from a runaway and no pulse signal is available at the output port O0, the outout level from the comparator CP goes low, turning off the transistor Q1 to apply a signal of a low level L to the reset terminal RESET of the microcomputer CPU. When the level at the reset terminal RESET goes low, the microcomputer CPU effects the same operation as when the power supply is switched on, so that the runaway state is brought to an end.

When CPU operation proceeds normally, the microcomputer CPU reads the levels at the input ports K0, K1, K2, K3 to determine the conditions of the various switches and effect processes according to the determined states of the switches.

When no input is varied (except when timers and flags are set), the program goes through steps S2 - S3 -

S4 - S42 - S43, executes a routine for storing a plurality of speeds shown in FIG. 3C, and then returns to the step S2. At this time, the contents of speed memories, the content of a target register, and the flags remain unchanged.

When the clutch switch SW3 or the stop switch SW4 is turned on in a step S6 or S7, or the automobile speed is lower than a predetermined value (for example, 30 Km/h) in a step S8, the output ports are set to a level not to energize the solenoids, the content of the target register R0 is cleared to release constant-speed control, and all the flags are cleared in a step S15. A constant-speed running mode is thereby released. Then, the release solenoid SL2 is de-energized in a step S16 to enable the vacuum actuator 100 to close the throttle valve 105 quickly. Thereafter, the program goes to a step S61, proceeds through the routine for storing a plurality of speeds, and returns to the step S2.

When the set switch SW5 is turned on in a step S9, the program goes only in a first cycle from the step S9 through steps S17 - S18 to a step S19 in which a set-on flag SET-ON is set to "1" and then to a step S20 in which a control-solenoid control duty is set to 5%. With the control-solenoid control duty being 5%, the proportion of time in which the vacuum control valve 110 enables the interior of the vacuum actuator 100 to be vented to the atmosphere is increased, so that the vacuum actuator 100 operates to close the throttle valve 105 and hence the automobile speed is lowered with time. In reality, the control solenoid is driven dependent on the established duty in a step S43. With the set switch SW5 depressed, the program proceeds through the routine for storing a plurality of speeds via steps S61 - S62 - S81 . . . , then goes through the steps S2 - S3 . . . S9 - S17 - S18 - S61.

When the set switch SW5 is turned off, the program goes through steps S9 - S10 - S11 - S12 - S13 - S14 to clear the set-on flag SET-ON to "0" and set a set-off flag SET-OFF to "1". Then, the program proceeds to the step S61 from which it goes through S68 - S69 - S70 - S81 . . . since the set-off flag SET-OFF is "1", for thereby incrementing the content of a counter (pointer) RA that designates a speed memory (the counter will not be incremented to more than 3), and clearing and starting a setting 1-sec timer. After this process, the set-off flag SET-OFF is cleared to "0". Therefore, the steps S67, S68, S69 and S70 are executed only in the first process cycle when the set switch SW5 is turned off. From a second cycle on, the program goes through the steps S61 - S62 - S63 . . . .

When the set switch SW5 is not turned on upon elapse of 1 second after it has been turned off, an overtime is detected in a step S63 and then the program goes through steps S64 - S65 - S66 to store the content of the target register R0 in a speed memory designated by the content of the counter RA, execute a throttle initializing routine (described later on), and bring the controlling operation into a constant-speed control mode.

The target register R0 stores an automobile speed gained at the moment when the step S14 is executed, that is, the set switch SW5 is turned off. Accordingly, that speed is stored in the designated speed memory. If the set switch SW5 is repeatedly turned on and off twice, for example, until it is finally turned off (for 1 second), then the process of the steps S67 - S68 - S69 - S70 is executed twice, and thus the content of the counter RA is two. Therefore, the content of the target register R0 is stored in the second speed memory. Three automobile speed memories are provided in the present embodiment, and the step S67 serves to prevent the content of the counter R0 from exceeding three. As a consequence, when the set switch SW5 is successively turned on and off more than three times, the third speed memory is selected.

In the constant-speed control mode, the program goes through steps S40 - S41 - S42 to establish again the control solenoid control duty so that the current automobile speed will be equalized to the content of the target register R0 or the stored automobile speed. If the set switch SW5 remains depressed, the condition in which the control duty is set to 5% in the step S20 continues and the automobile speed is gradually lowered.

When the resume switch SW6 is turned on, the program proceeds in a first cycle through steps S31 - S44 - S45 -S46 - S47 - S48 - S43 to set a resume-on flag RESUME-ON to "1" and clear and start a resuming 0.9-sec timer. Then, the program goes through a process loop composed of the steps S61 . . . S81 - S82 - S2. When the resume switch SW6 remains continuously depressed for 0.9 sec, an overtime is detected in a step S48 and the control solenoid control duty is set to 90% in a step S49. At the control solenoid control duty of 90%, the proportion of time in which the vacuum control valve 110 enables the interior of the vacuum actuator 100 to be vented to the atmosphere is increased, and the vacuum actuator 110 operates with time to open the throttle valve 105 for thereby increasing the automobile speed.

When the resume switch SW6 is turned off, the program proceeds through steps S31 - S32 - S33 - S34 - S35 - S36 . . . to clear the resume-on flag RESUME-ON to "0" and set a resume-off flag RESUME-OFF to "1". If the resume switch SW6 is depressed for a long time and an overtime is detected on the 0.9-sec timer in the step S36, then the program goes from the step S36 through steps S37 - S38 - S39 to store the current automobile speed in the target register R0, store the content of the target register R0 in a speed memory indicated by the content of the counter RA, and clear the resume-off flag RESUME-OFF to "0".

If the resume switch SW6 is turned off before the time set by the 0.9-sec timer expires, then the program proceeds through S81 - S87 - S88 - S89 - S90 since the resume-off flag RESUME-OFF is "1", thus incrementing the content of the counter RA, clearing and starting a resuming 1-sec timer, and clearing the resume-off flag RESUME-OFF to "0". The process of the steps S81 - S87 - S88 - S89 - S90 is executed once while the resume-off flage RESUME-OFF is "1", that is, each time the resume switch SW6 changes from the turn-on state to the turn-off state. Therefore, the counter RA stores the number of times in which the resume switch SW6 changes from the turn-on state to the turn-off state.

Upon elapse of one second after the resume switch SW6 has been turned off, an overtime is detected on the resuming 1-sec timer and the program goes through steps S81 - S82 - S83 - S84 - S85 - S86 to store the content of a speed memory designated by the content of the counter RA, for example, the content of the third speed memory if the resume switch SW6 is turned on and off three times, into the target register R0. The step 86, or a throttle initializing routine, is executed to establish a constant-speed control mode. In the constant-speed control mode, the program goes through the steps S40 - S41 - S42 - S43 to renew the control solenoid control duty so that the current automobile speed will approach the content of the target register.

The throttle initializing routine will be described with reference to FIG. 3E. The throttle initializing routine is composed of steps S121 through S126 and serves to effect open-loop control for driving the vacuum actuator 100 rapidly to a desired position in which the throttle valve has an initial opening. More specifically, the control solenoid control duty is set at a high value (90%), and the time in which the control solenoid control duty is set at such a value is computed from the content of the target register R0. The computed time is set in a timer, and the control solenoid is continuously controlled at the duty of 90% until the time set in the timer expires. Upon elapse of the time, a constant-speed control flag is set for establishing a constant-speed mode.

The interrupt process will be described with reference to FIG. 3D. The interrupt process has steps S101 through S104 for determining a period of on/off operation of the speed detecting reed switch SW2. Each time the interrupt process is executed or the switch SW2 is turned off, the count in an internal timer is read and the timer is cleared and started. When the count in the timer exceeds a predetermined value (that is, the automobile speed is below a predetermined value), a low-speed flag is set. When the low-speed flag is set, the program goes from the step S8 to the step S15 in the main routine to release the control-speed control mode in the same manner as when the clutch pedal or the brake pedal is depressed.

The speed memories may be selected by time intervals of operation or combinations of time intervals of operation of the set and resume switches. As many speed memories as desired may be provided within the memory capacity of the microcomputer.

Figure 4:
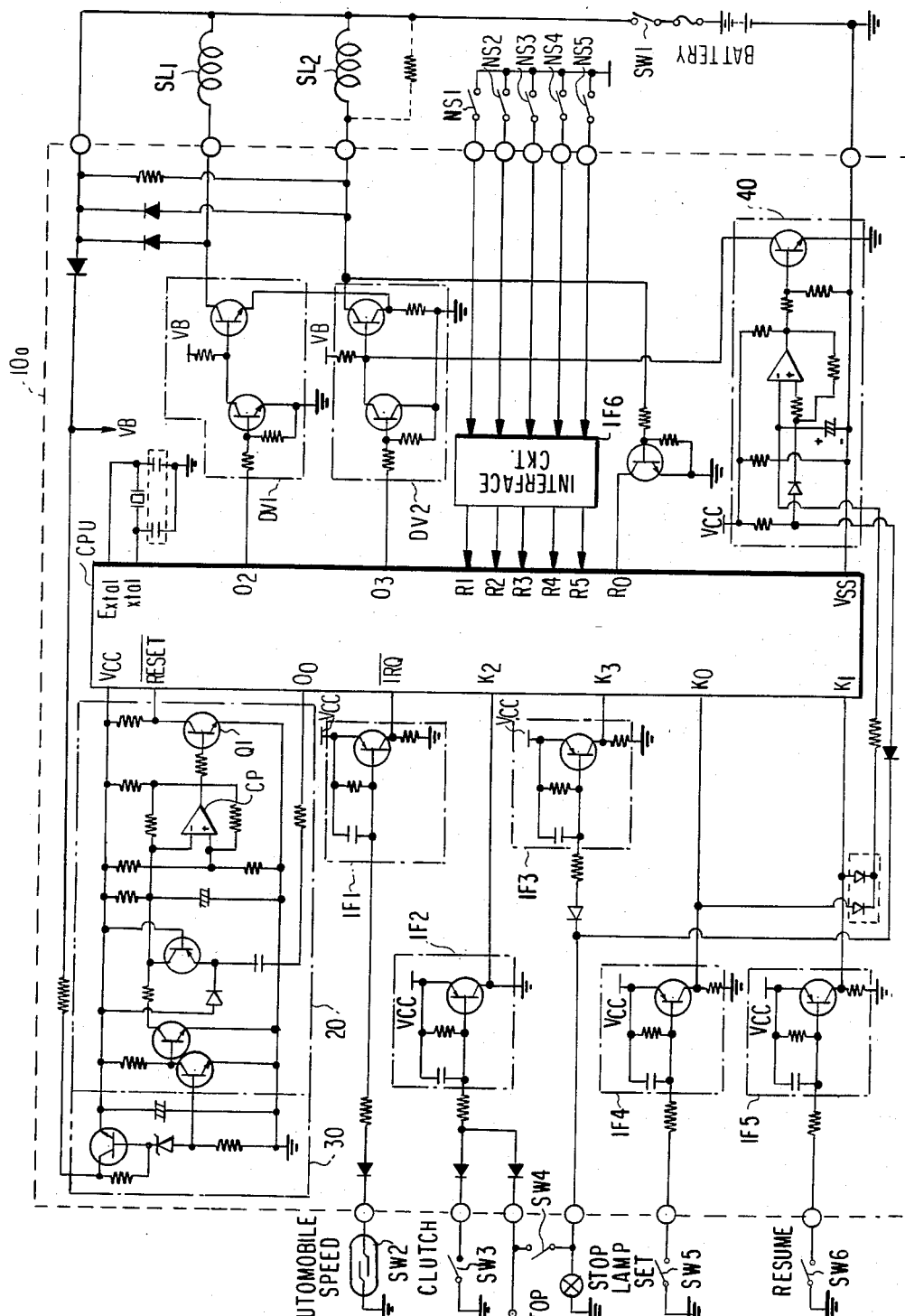
FIG. 4 is a block diagram of an electric circuit of an automobile speed system according to another embodiment of the present invention.

FIG. 4 illustrates an electronic control unit 10a in an automobile speed control system according to another embodiment of the present invention. The electronic control unit 10a serves to control the solenoids SL1, SL2 in the vacuum actuator 100 shown in FIG. 2, and is of substantially same construction as that of the electronic control unit 10 shown in FIG. 1 except that a microcomputer CPU' has input ports R1, R2, R3, R4 and R5 connected through an interface circuit IF6 to speed memory selector switches NS1, NS2, NS3, NS4 and NS5, respectively.

For the sake of brevity, the components of the electronic control unit 10a which are idential to those shown in FIG. 1 and their operation will not be described. Operation of the microcomputer CPU' is different from that of the microcomputer CPU according to the first embodiment in that the program for the microcomputer CPU' includes a different routine for storing a plurality of automobile speeds.

Operation of the microcomputer CPU' will now be described with particular reference to FIG. 5. The microcomputer CPU' also operates to execute the program routines shown in FIGS. 3A, 3B, 3D and 3E, and no description will be given for these routines.

While the microcomputer CPU' operates normally without suffering from a runaway, the microcomputer CPU' reads the levels at the input ports R1 through R5 in addition to the levels at the input ports K0, K1, K2, K3.

Figure 5:
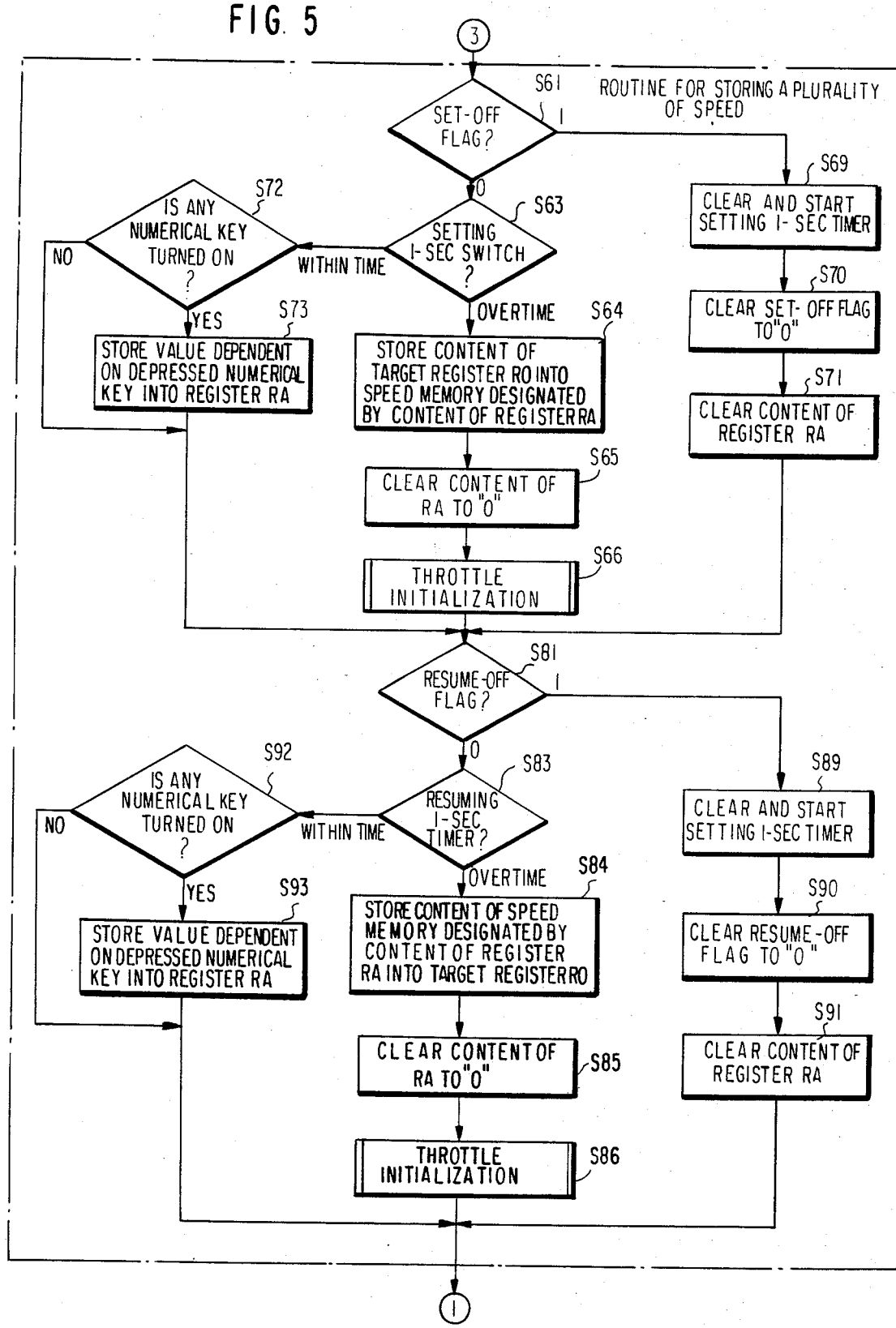
FIG. 5 is a flowchart illustrating a routine for storing a plurality of automobile speeds.

When the set switch SW5 is depressed, the program goes through the routine of FIG. 5 via steps S61 - S63 -S72 - S81 . . . and then goes through the steps S2 - S3 . . . S9 - S17 - S18 - S61.

When the set switch SW5 is turned off, the program proceeds through the steps S9 - S10 - S11 - S12 - S13 - S14 to clear a set-on flag SET-ON to "0" and set a set-off flag SET-OFF flag to "1". Then, the program goes to the step S61 and then proceeds through S69 - S70 - S81 . . . since the set-off flag SET-OFF is "1", thus clearing and starting a setting 1-sec timer, clearing the set-off flag SET-OFF to "0", and clearing the content of a speed memory designating register RA.

The speed memory selector switches NS1 through NS5 may comprise numerical keys. When one of the speed memory selector switches is turned on, the program goes through steps S72 - S73 - S81 to store a value dependent on the depressed speed memory selector switch into the speed memory designating register RA.

Upon elapse of one second after the set switch SW5 has been turned off, an overtime is detected in a step S63, and the program goes through steps S64 - S65 - S66 to store the content of a target register R0 into a speed memory designated by the content of the register RA and execute the throttle initializing routine as described above, whereupon the electronic control unit enters the constant-speed control mode. Since the target register R0 stores the automobile speed gained at the moment the step S14 is executed, that is, the set switch SW5 is turned off, that speed is stored in the memory designated by the register Ra.

In the embodiment of FIGS. 4 and 5, the switches NS1 through NS5 correspond respectively to the first through fifth speed memories. When the numerical key NS5 is turned on after the set switch SW5 has been depressed, the automobile speed at the time the set switch SW5 is turned off is stored in the fifth speed memory.

In the constant-speed control mode, the program goes through steps S40 - S41 - S42 (FIG. 3B) to establish again the control solenoid control duty so that the current automobile speed will be equalized to the content of the target register R0 or the stored automobile speed. If the set switch SW5 remains depressed, the condition in which the control duty is set to 5% in the step S20 continues and the automobile speed is gradually lowered.

When the resume switch SW6 is turned on, the program proceeds in a first cycle through steps S31 - S44 - S45 -S46 - S47 - S48 - S43 to set a resume-on flag RESUME-ON to "1" and clear and start a resuming 0.9-sec timer. Then, the program goes through a process loop composed of the steps S61 . . . S81 - S82 - S2. When the resume switch SW6 remains continuously depressed for 0.9 sec, an overtime is detected in a step S48 and the control solenoid control duty is set to 90% in a step S49. At the control solenoid control duty of 90%, the proportion of time in which the vacuum control valve 110 enables the interior of the vacuum actuator 100 to be vented to the atmosphere is increased, and the vacuum actuator 110 operates with time to open the throttle valve 105 for thereby increasing the automobile speed.

When the resume switch SW6 is turned off, the program proceeds through steps S31 - S32 - S33 - S34 - S35 - S36 . . . to clear the resume-on flag RESUME-ON to "0" and set a resume-off flag RESUME-OFF to "1". If the resume switch SW6 is depressed for a long time and an overtime is detected on the 0.9-sec timer in the step S36, then the program goes from the step S36 through steps S37 - S38 - S39 to store the current automobile speed in the target register R0 and store the content of the target register R0 in a speed memory indicated by the content of the register RA in the same manner as when the set switch SW5 is turned on and off. The resume-off flag RESUME-OFF is cleared to "0" so as not to effect a normal resuming operation in the routine for storing a plurality of speeds shown in FIG. 5.

If the resume switch SW6 is turned off before the time set by the 0.9-sec timer expires, then the program proceeds through S81 - S89 - S90 since the resume-off flag RESUME-OFF is "1", thus clearing and starting a resuming 1-sec timer, and clearing the resume-off flag RESUME-OFF to "0". If one of the numerical keys or the speed memory selector switches is turned on, then the program proceeds through steps S83 - S92 - S93 to store a value dependent on the depressed speed memory selector switch into the speed memory designating register RA.

Upon elapse of one second after the resume switch SW6 has been turned off, an overtime is detected on the resuming 1-sec timer and the program goes through steps S81 - S83 - S84 - S85 - S86 to store the content of a speed memory designated by the content of the register RA, for example, the content of the third speed memory when the numerical key NS3 is depressed, into the target register R0. A throttle initializing routine is executed in the step S86 to establish a constant-speed control mode. When the constant-speed control mode is started, the program goes through the steps S40 - S41 - S42 - S43 to renew the control solenoid control duey so that the current automobile speed will approach the content of the target register.

Figure 6:
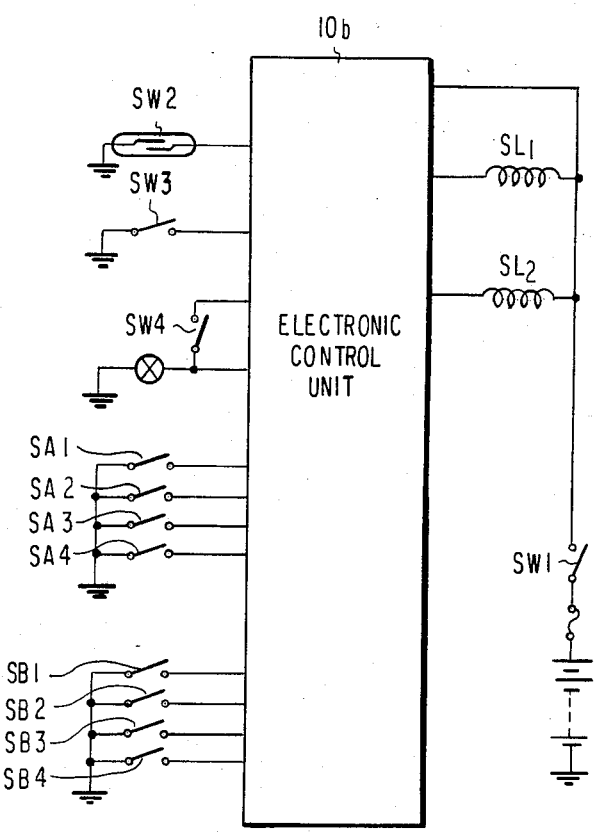
FIG. 6 is a circuit diagram, partly in block form, of an electric circuit of an automobile speed control system according to still another embodiment of the present invention.

FIG. 6 shows an electronic control unit 10b according to still another embodiment of the present invention. The electronic control unit 10b is substantially the same as the electronic control unit 10a except that there are four set switches SA1, SA2, SA3 and SA4 and four resume switches SB1, SB2, SB3 and SB4.

Figure 3A:
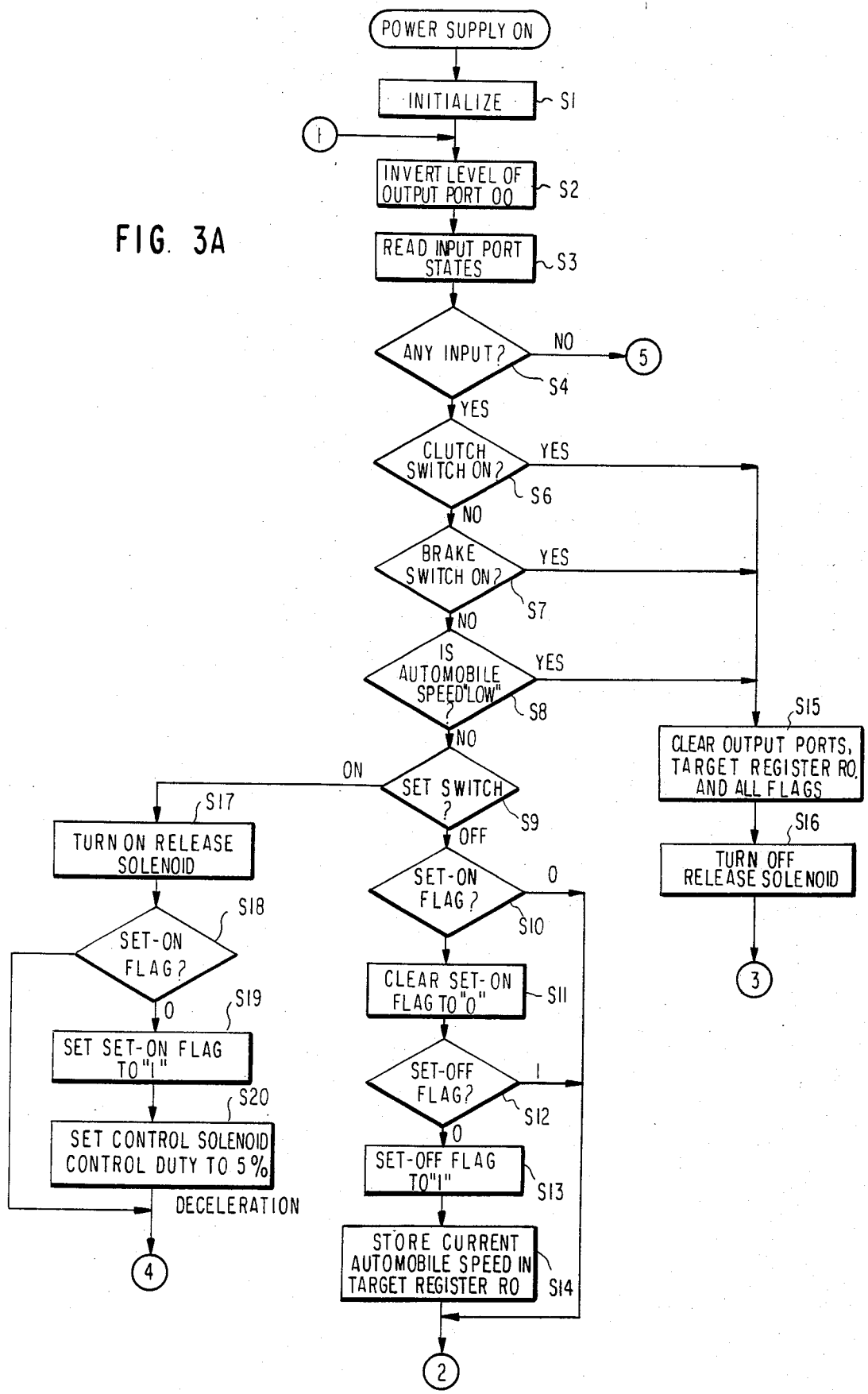
Figure 3D:
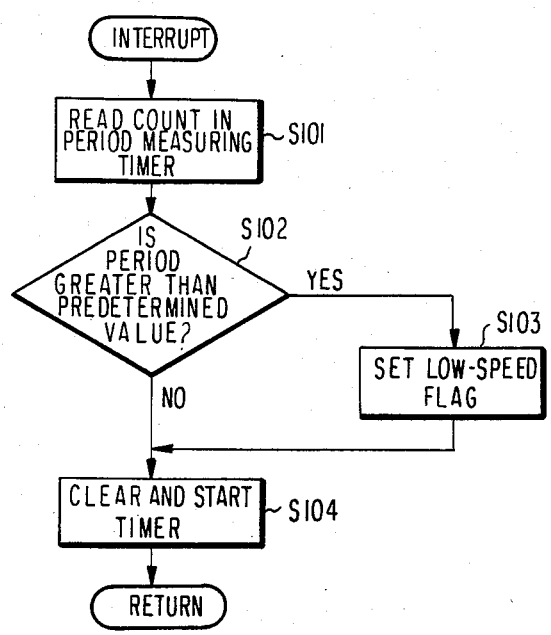
FIG. 3D is a flowchart showing an interrupt process.
Figure 3E:
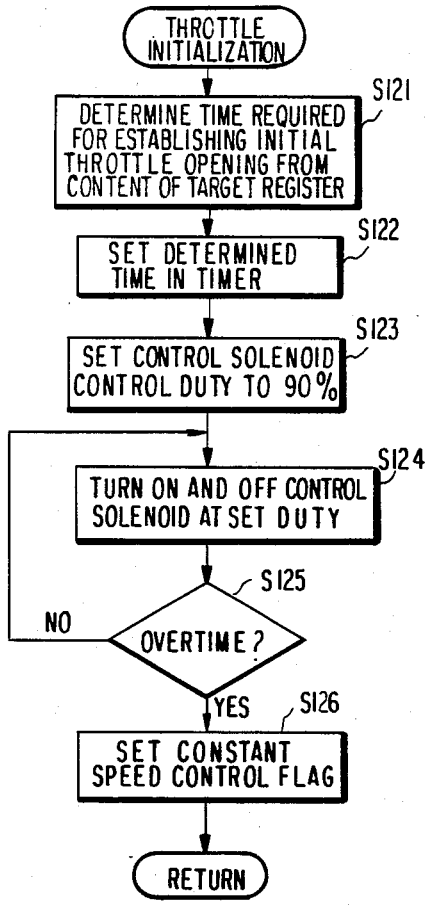
FIG. 3E is a flowchart showing a throttle initializing routine.
Figure 7A:
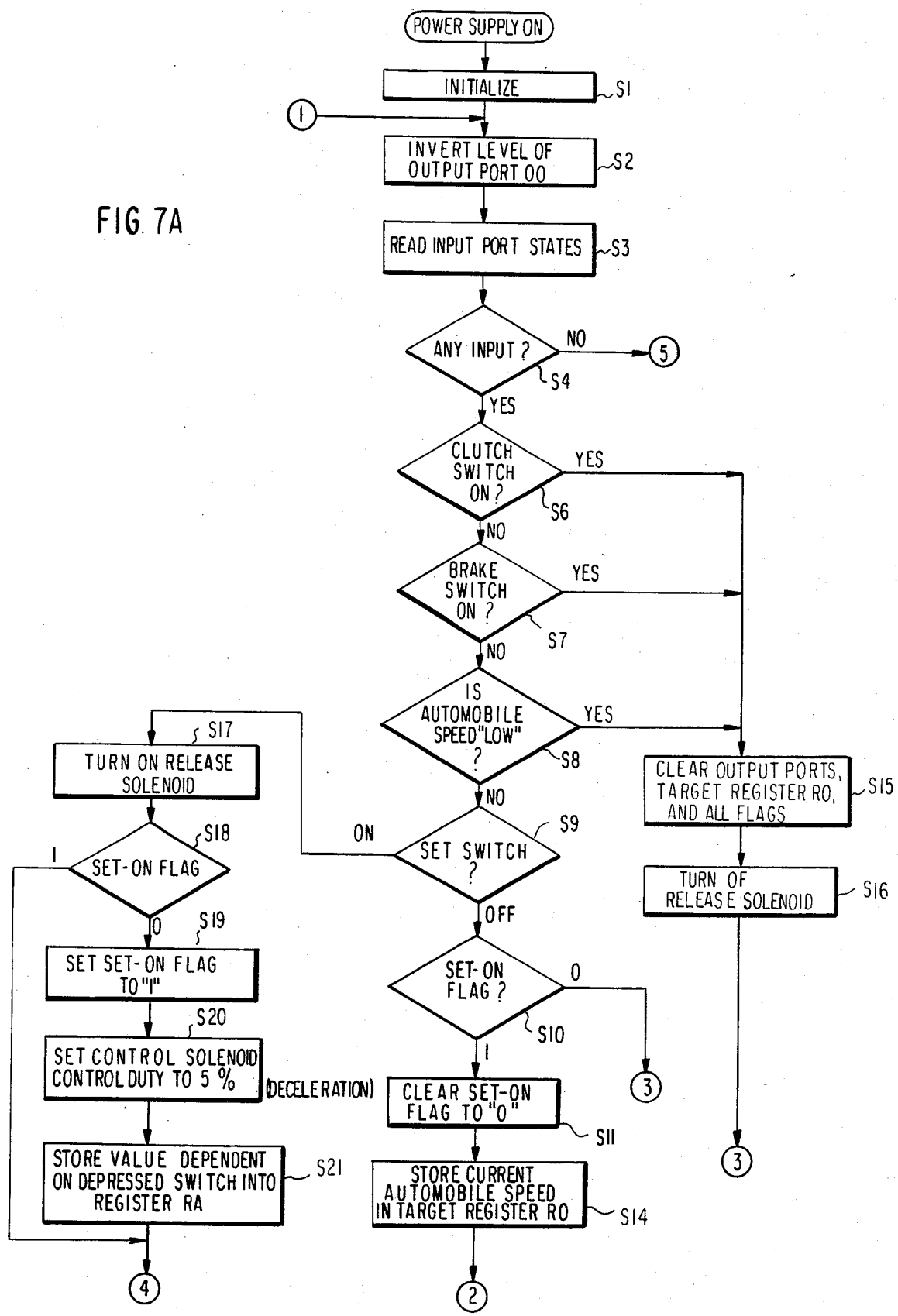
FIGS. 7A and 7B are a flowchart showing operation of an electronic control unit in the automobile speed control system illustrated in FIG. 6.
Figure 7B:
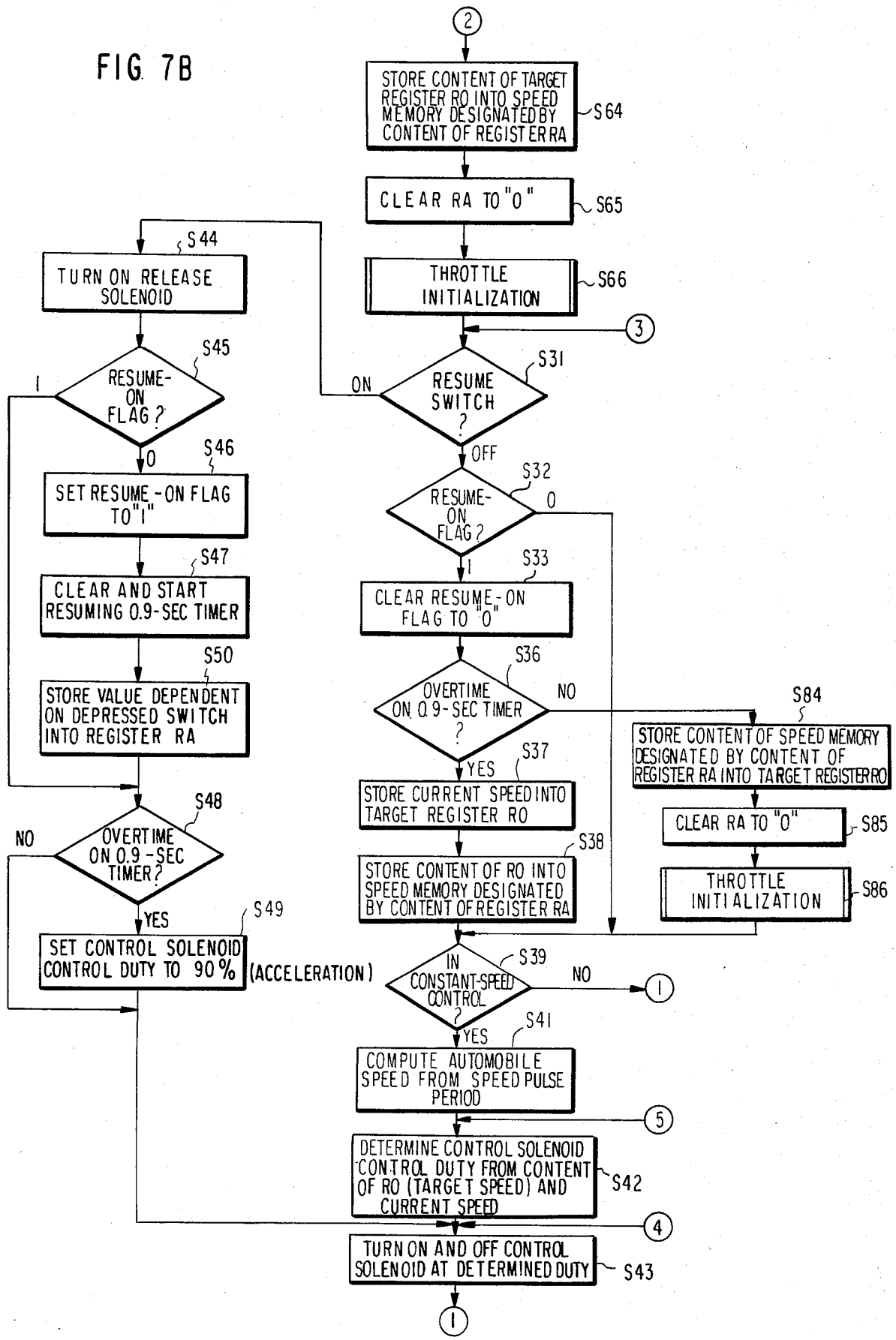

FIGS. 7A and 7B show a main routine of operation of the electronic control unit 10b, the main routine corresponding to that shown in FIGS. 3A, 3B and 3C. The operation of the electronic control unit 10b also includes interrupt and throttle initialization subroutines which are the same as those shown in FIGS. 3D and 3E and will not be described.

According to the embodiment shown in FIGS. 6, 7A and 7B, the pairs of set and resume switches are associated with speed memories, respectively, in the electronic control unit 10b. More specifically, the set and resume switches SA1 and SB1 are associated with a first speed memory, the set and resume switches SA2 and SB2 are associated with a second speed memory, the set and resume switches SA3 and SB3 are associated with a third speed memory, and the set and resume switches SA4 and SB4 are associated with a fourth speed memory. Therefore, when the set switch SA2, for example, is depressed, an automobile speed is stored in the second memory, and when the resume switch SB4 is depressed, the automobile speed is controlled by the speed stored in the fourth speed memory.

Operation of the electronic control unit 10b will be described with reference to FIGS. 7A and 7B. When one of the set switches SA1, SA2, SA3 and SA4 is turned on, the programs goes through steps S2 - S3 - S4 ... S9 - S17 - S18 - S19 - S20 ... to set a set-on flag SET-ON to "1", set a control solenoid control duty to 5%, and store a numerical value allotted to the depressed set switch into an automobile speed memory designating register RA. For example, when the set switch SA3 is turned on, "3" is stored in the register RA.

When the depressed set switch is turned off, the program goes through the steps S2 - S3 - S4 ... S9 - S10 - S11 - S14 - S64 - S65 - S66 for clearing the set-on flag SET-ON to "0", storing a current automobile into a target register R0, storing the content of the target register R0 into one of the speed memories which is designated by the content of the register RA, and clearing the content of the register RA. Then, a throttle initializing routine is executed to enter a constant-speed control mode.

When one of the resume switches SB1, SB2, SB3 and SB4 is turned on, the program goes through steps S31 - S44 - S45 - S46 - S47 ... to set a resume-on flag RESUME-ON to "1", clear and start a resuming 0.9-sec timer, and store a numerical value allotted to the depressed resume switch into an automobile speed memory designating register RA. For example, when the resume switch SB1 is turned on, "1" is stored in the register RA.

When the depressed resume switch is turned off, the program goes through the steps S31 - S32 - S33 - S36 ... for clearing the resume-on flag RESUME-ON to "0". If the time in which the resume switch remains depressed does not reach 0.9 sec., then the program proceeds through steps S84 - S85 - S86 ... to store the content of the speed memory designated by the content of the register RA into the target register R0 and execute a throttle initializing routine for entering a constant-speed control mode.

When the time in which the resume switch remains depressed exceeds 0.9 sec., then an overtime is detected in a step S36 and the program goes through steps S37 - S38 to store a current automobile speed into the target register R0 and store the content of the target register R0 into the speed memory designated by the register RA in the same manner as when a set switch is depressed. Where an overtime occurs, a step 49 is executed prior to the above process. Therefore, as long as the resume switch remains depressed, the control solenoid control duty is maintained at 90% to increase the automobile speed gradually.

In the embodiments of FIGS. 4 and 6, there are as many speed memories as there are automobile speed memory selector switches (FIG. 4) or there are pairs of set and resume switches (FIG. 6). However, more speed memories than switches may be provided. For example, in the embodiment of FIG. 4, there are five speed memory selector switches NS1 through NS5 and there are 32 combinations of turned-on and turned-off states of these selector switches. Therefore, one of 32 speed memories may be selected at a time by these five speed memory selector switches. This arrangement however results in a poor switch manipulation capability since a plurality of switches must be operated upon to select one of the speed memories.

Although certain preferred embodiments have been shown and described, it should be understood that many changes and modifications may be made therein without departing from the scope of the appended claims.

For example, instead of the vacuum actuator, a motor such as a stepping motor may be employed to actuate the throttle valve. The electronic control unit may comprise a logic circuit or an analog circuit rather than the microcomputer. Where an analog circuit is used, pulses indicative of an automobile speed may be converted by a F/V converter into a voltage, and each speed memory may be composed of a sample and hold comprising a capacitor, an analog gate and other components. The automobile speed may be detected by any detector capable of generating a frequency output or an analog output indicative of an automobile speed. The paired set and resume switches may be housed in one case and interlinked so that when the set switch is turned on the resume switch will automatically be turned off or vice versa. The automobile speed memory selector switches according to the second embodiment of FIG. 4 may be in the form of a keypad.

What is claimed is:

1. An automobile speed control system for use with an automobile, comprising:
   (a) a throttle valve;
   (b) actuator means operatively connected to said throttle valve for actuating said throttle valve;
   (c) a plurality of switch means;
   (d) detector means for detecting a speed of the automobile;
   (e) a plurality of automobile speed memories; and
   (f) electronic control means for storing values dependent on output signals issued from said detector means into said automobile speed memories, respectively, in response to operation of said switch means, for reading the values, one at a time, from said automobile speed memories in response to operaiton of said switch means, and for energizing said actuator means according to the read values.

2. An automobile speed control system according to claim 1, wherein said actuator means comprises a vacuum actuator having a vacuum-responsive member operatively connected to said throttle valve, a vacuum control valve for actuating said vacuum-responsive member, and a vacuum control solenoid for actuating said vacuum control valve under the control of said electronic control means.

3. An automobile speed control system according to claim 8, wherein said vacuum actuator includes a vacuum release valve for releasing said vacuum-responsive member and a vacuum release solenoid for controlling said vacuum release valve under the control of said electronic control means.

4. An automobile speed control system according to claim 9, wherein said electronic control means is programmed for energizing said vacuum release solenoid when the automobile is braked.

5. An automobile speed control system according to claim 1, wherein said switch means include first and second switches, said electronic control means being programmed to respond to operation of said first switch for storing the values dependent on the output signals from said detector means into said automobile speed memories designated by operative conditions of said first switch and also respond to operation of said second switch for reading the values from the automobile speed memories designated by operative conditions of said second switch to operate said actuator means according to the read values.

6. An automobile speed control system according to claim 5, wherein said electronic control means is programmed to select the automobile speed memories according to the number of operations of said first and second switches within a predetermined period of time.

7. An automobile speed control system according to claim 5, wherein said electronic control means is programmed to respond to operation of said first switch for storing a value dependent on an output signal from said detector means into one of said automobile speed memories which is designated by an operative condition of said first switch and for energizing said actuator means according to an automobile speed corresponding to the stored value.

8. An automobile speed control system according to claim 5, wherein said electronic control means is programmed for energizing said actuator means to reduce an opening of said throttle valve when said first switch is in a predetermined state.

9. An automobile speed control system according to claim 5, wherein said electronic control means is programmed for energizing said actuator means to increase an opening of said throttle valve while said second switch remains in a predetermined state beyond a predetermined period of time.

10. An automobile speed control system according to claim 5, wherein said electronic control means is programmed for energizing said actuator means to increase an opening of said throttle valve while said second switch remains in a predetermined state beyond a predetermined period of time and for storing an automobile speed gained when the state of the second switch varies into the automobile speed memory to control the speed of the automobile with the stored automobile speed.

11. An automobile speed control system according to claim 1, wherein said switch means include at least first, second and third switches, said electronic control means being programmed to respond to operation of each of the switches for discriminating at least first and second conditions according to states of the operated switch, to store a value dependent on an output signal from said detector means into one of the automobile speed memories which is designated by the state of the operated switch in said first condition, and to read the value from the automobile speed memory designated by the state of the operated switch and to energize the actuator means according to the read value in said second condition.

12. An automobile speed control system according to claim 11, wherein said electronic control means is programmed to respond to operation of said first switch for storing a value dependent on an output signal from said detector means into one of the automobile speed memories which is designated by a state of said third switch and to respond to operation of said second switch for reading the value from the automobile speed memory designated by the state of said third switch and for energizing said actuator means according to the read value.

13. An automobile speed control system according to claim 12, wherein said electronic control means is programmed to respond to operation of said first switch for energizing said actuator means according to an automobile speed corresponding to the stored value.

14. An automobile speed control system according to claim 12, wherein said electronic control means is programmed for energizing said actuator means to reduce an opening of said throttle valve when said first switch is in a predetermined state.

15. An automobile speed control system according to claim 12, wherein said electronic control means is programmed for energizing said actuator means to increase an opening of said throttle valve while said second switch remains in a predetermined state beyond a predetermined period of time.

16. An automobile speed control system according to claim 12, wherein said electronic control means is programmed for energizing said actuator means to increase an opening of said throttle valve while said second switch remains in a predetermined state beyond a predetermined period of time and for storing an automobile speed gained when the state of the second switch varies into the automobile speed memory to control the speed of the automobile with the stored automobile speed.

17. An automobile speed control system according to claim 11, wherein said switch means include first and second groups of switches, said electronic control means being programmed to respond to operation of at least one of the switches of the first group for storing a value dependent on an output signal from said detector means into one of the automobile speed memories which is designated by a state of the operated switch, and to respond to operation of at least one of the switches of the second group for reading the value from the automobile speed memory designated by a state of the operated switch and for energizing the actuator means according to the read value.

18. An automobile speed control system according to claim 17, wherein said electronic control means is programmed to respond to operation of said first switch for energizing said actuator means according to an automobile speed corresponding to the stored value.

19. An automobile speed control system according to claim 17, wherein said electronic control means is programmed for energizing said actuator means to reduce an opening of said throttle valve when said first switch is in a predetermined state.

20. An automobile speed control system according to claim 17, wherein said electronic control means is programmed for energizing said actuator means to increase an opening of said throttle valve while said second switch remains in a predetermined state beyond a predetermined period of time.

21. An automobile speed control system according to claim 17, wherein said electronic control means is programmed for energizing said actuator means to increase an opening of said throttle valve while said second switch remains in a predetermined state beyond a predetermined period of time and for storing an automobile speed gained when the state of the second switch varies into the automobile speed memory to control the speed of the automobile with the stored automobile speed.

* * * * *